United States Patent [19]

Sklar et al.

[11] Patent Number: 5,308,483
[45] Date of Patent: May 3, 1994

[54] MICROPOROUS FILTRATION FUNNEL ASSEMBLY

[75] Inventors: Eric Sklar, Northville; Tod Borton, Whitmore Lake, both of Mich.

[73] Assignee: Gelman Sciences Inc., Ann Arbor, Mich.

[21] Appl. No.: 936,594

[22] Filed: Aug. 27, 1992

[51] Int. Cl.$^5$ ............... B01D 29/05; B01D 35/02
[52] U.S. Cl. ............ 210/232; 210/238; 210/445; 210/446; 210/450; 210/406; 210/455; 210/474; 210/482; 210/321.75; 210/321.84; 422/101; 435/311; 604/406; 73/863.23; 73/863.25
[58] Field of Search ........... 210/232, 238, 445, 446, 210/450, 406, 474, 482, 455, 321.75, 321.84; 604/190, 406; 422/101; 435/311; 73/863.23, 863.25

[56] References Cited

U.S. PATENT DOCUMENTS

| | | | |
|---|---|---|---|
| 2,904,857 | 9/1959 | Goetz | 435/311 |
| 3,295,686 | 1/1967 | Krueger | 435/311 |
| 4,111,807 | 9/1978 | Boomus | 210/446 |
| 4,148,732 | 4/1979 | Burrow | 210/445 |
| 4,170,056 | 10/1979 | Meyst | 604/406 |
| 4,251,366 | 2/1981 | Simon et al. | 210/767 |
| 4,357,240 | 11/1982 | Mehra et al. | 210/455 |
| 4,614,585 | 9/1986 | Mehra et al. | 210/433 |
| 4,678,576 | 7/1987 | Leoncavallo | 210/433.2 |
| 4,689,147 | 8/1987 | Leoncavallo | 210/232 |
| 4,826,594 | 5/1989 | Sedman | 210/282 |
| 4,829,005 | 5/1989 | Friedman et al. | 435/296 |
| 5,112,488 | 5/1992 | Lemonnier | 422/101 |
| 5,141,639 | 8/1992 | Kraus | 604/406 |
| 5,200,067 | 4/1993 | Sann | 210/232 |
| 5,234,585 | 8/1993 | Zuk | 210/232 |

FOREIGN PATENT DOCUMENTS 1351752  5/1974  United Kingdom ............ 210/482

Primary Examiner—Thomas M. Lithgow
Attorney, Agent, or Firm—Krass & Young

[57] ABSTRACT

An in-line filter assembly is provided of a type having a housing divided into inlet and outlet chambers by a filter membrane having its periphery fluid-flow-sealed within the housing, the filter being readily disassemblable so that the filter membrane can be removed for identification or analysis of the material filtered from the fluid during use of the filter.

15 Claims, 3 Drawing Sheets

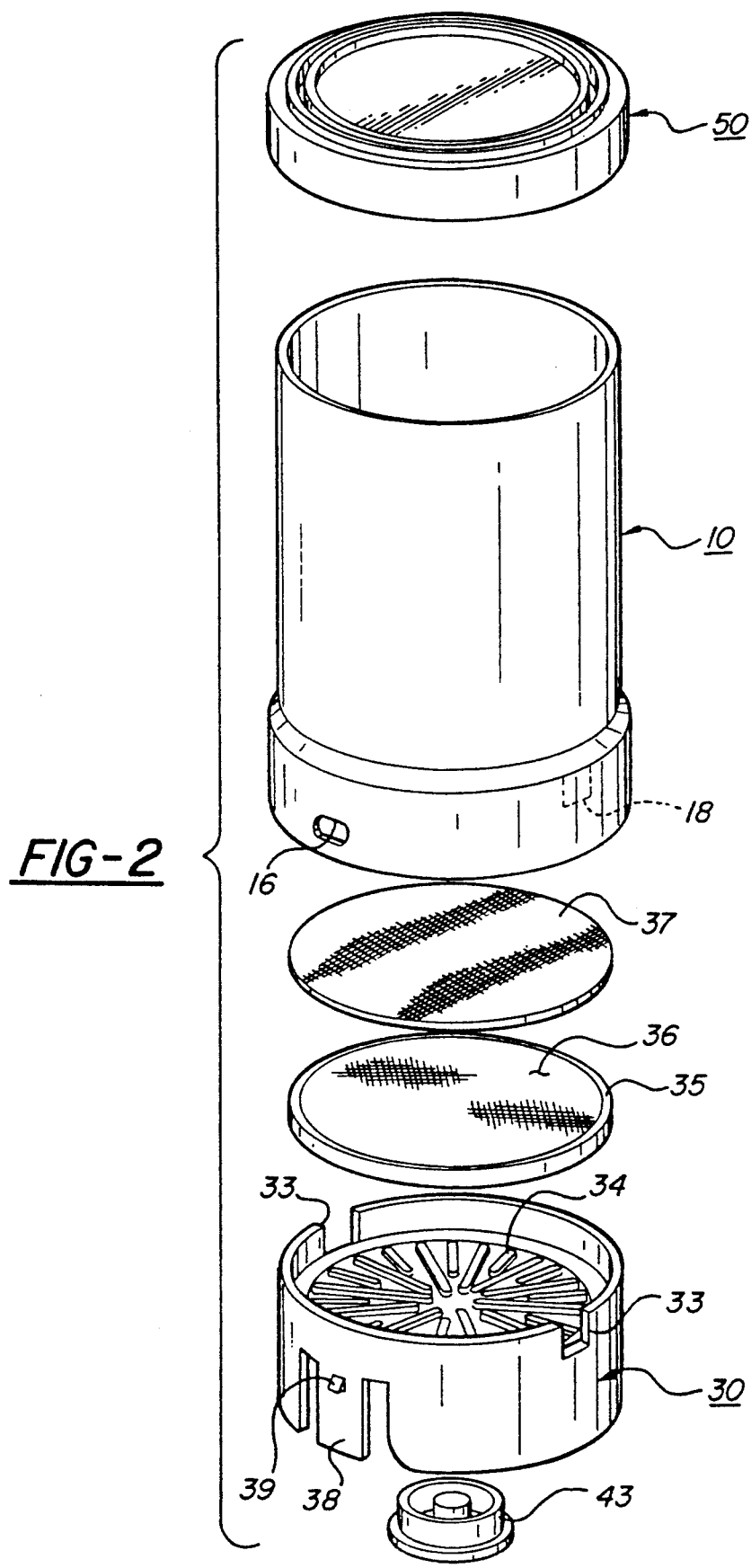

MICROPOROUS FILTRATION FUNNEL ASSEMBLY

FIELD OF THE INVENTION

This invention relates to an in-line filter assembly of a type having a housing divided into inlet and outlet chambers by a filter membrane having its periphery fluid-flow-sealed within the housing, the assembly being readily disassemblable so that the filter membrane can be removed for identification or analysis of the material filtered from the fluid during use of the filter.

BACKGROUND ART

Disposable in-line filters are conventionally made of two molded polymeric plastic housing components with peripheral flanges which are permanently sealingly bonded together with the periphery of the filter membrane therebetween. Such in-line filters can be made at relatively low cost. However, after use the filter membrane cannot be removed intact for identification and analysis of materials on the membrane resulting from the filtration. Disassemblable in-line filters enabling filter membrane removal after filtration are known; however, they have been of costly construction rendering it uneconomical to dispose of them after just one use. On the other hand, reuse of such filters is likewise uneconomical because of the cleaning operations required between uses.

The filter device of the present invention is readily disassemblable for filter membrane removal after use yet is of relatively low cost construction so that it can be disposed of after a single use.

BRIEF DESCRIPTION OF THE INVENTION

According to a preferred embodiment of the invention, the filtration funnel assembly comprises an open-ended upper body or reservoir for receiving liquid to be filtered and a lower body or filter base adapted to telescopically engage with and disengage from the upper body. Preferably, these bodies are generally cylindrical in shape. The upper body has a first rim portion defining an internal shoulder and a second rim portion defining an external shoulder having an inner wall surface. The lower body which serves as a conduit for leak-proof axial flow of filtered liquid therethrough comprises 1) an outer wall or shell having an upper rim portion that is telescopically engageable between the internal and external shoulders of the upper body, 2) a transverse filter support, 3) an annular gasket, 4) a filter pad, and 5) a filter membrane. The annular gasket and the filter pad are preferably formed together as an integral unit. The rim portion of the external shoulder has locking open slot means, and the outer wall has tab means with radially outward projection means such as an inclined wedge or pair of circumferentially spaced wedges that forms a lock fit with the locking slot means when the upper and lower bodies are aligned in telescopic engagement.

In a preferred embodiment, the upper rim portion of the outer wall comprises access slot means allowing access therethrough for grasping the edge of the filter membrane for removal of the membrane from the lower body when it is disengaged from the upper body. Preferably, the inner wall surface is formed with guide rib means located in circumferential registry with the access slot means when the upper and lower bodies are in telescopic engagement. The guide ribs are circumferentially spaced from the locking slot means so as to guidably assist the upper and lower bodies to be correctly placed for joining the projections of the tab means and the locking slots so that the bodies are in interlocking telescopic engagement. Preferably, for this purpose, the filter assembly comprises a diametrically opposed pair of slot means and a matching pair of tab means. Preferably, the funnel assembly has a drain port means comprising a central opening in the filter support preferably with a closure and preferably formed as a drain spout.

Preferably, for locking the tab means, the filter assembly comprises a pair of diametrically opposed inwardly flexible tabs each formed with a projection or projections, preferably in a wedge shape, at its outer surface in locking registry with respective locking slot means such that the upper and lower bodies are axially interlocked together. The invention contemplates that the base may be formed with the tab means and the upper body may be formed with locking slot means or vice versa. In either case, the tab means are adapted to be releasable from the interlock by manually squeezing the tabs together. Preferably, as assembled, the periphery of the filter membrane is in direct sealing contact with, and is superposed upon the annular gasket, preferably so that the filter membrane lies flat upon the filter pad. For convenience, the upper body and the lower body are each formed with an opening that one at a time may be closed by a common interchangeable closure. Preferably for use, the upper and lower bodies are in telescopic engagement suitable for air and fluid tight filtration under vacuum, the intake opening of the upper body and the drain port of the base being sealed respectively each by a closure and the lower rim of the internal shoulder being held under axial, fully sealing compression by contact with the periphery of the filter membrane which periphery is in direct compressive, fully sealing contact with the annular gasket.

BRIEF DESCRIPTION OF THE DRAWINGS

FIG. 2 is an exploded view in perspective of the filter unit of FIG. 1;

BEST MODE FOR THE PRACTICE OF THE INVENTION

Figure 1:
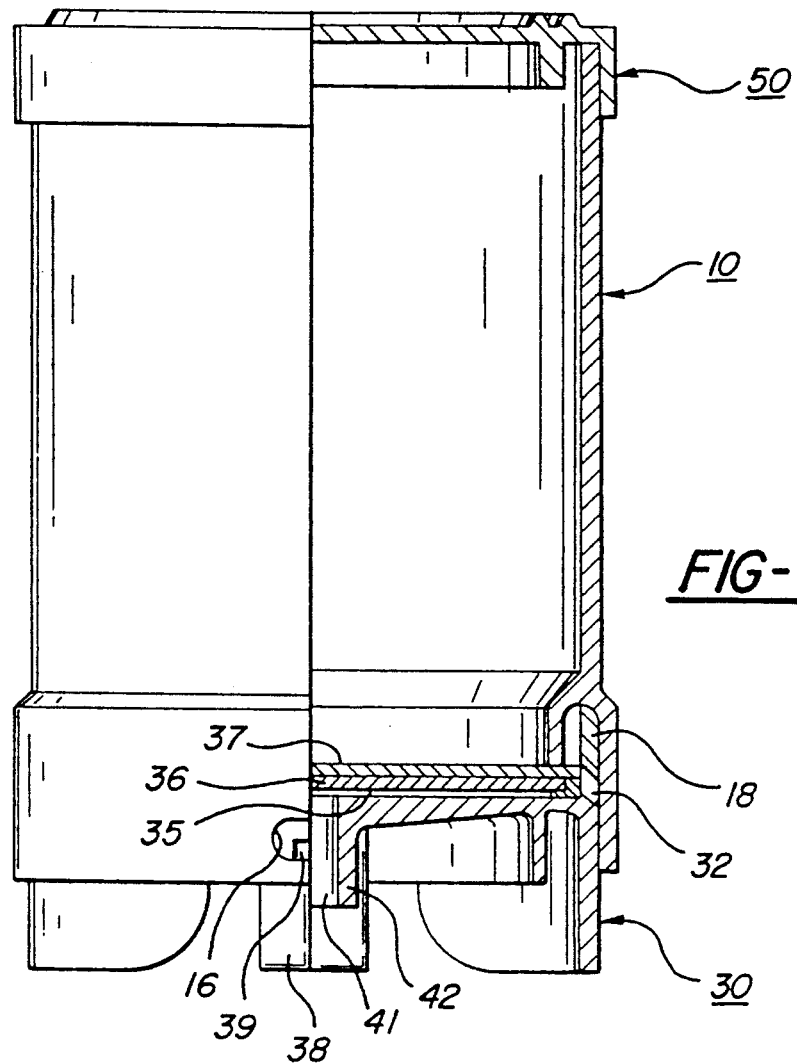
FIG. 1 is a side elevational view of a preferred filter unit of the invention, partly in diametral cross-section taken on line 1—1 of FIG. 2.
Figure 5:
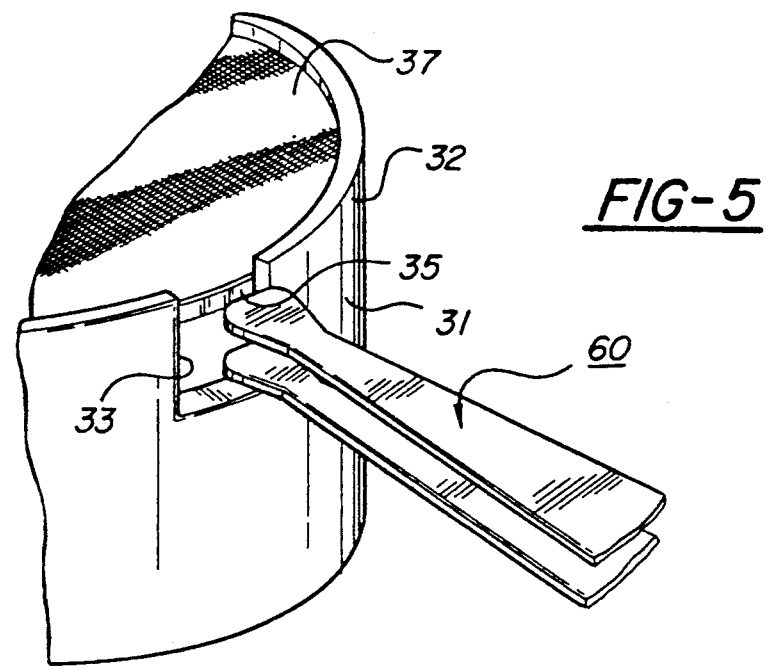
FIG. 5 is an enlarged fragmentary view in perspective illustrating the manner of grasping the filter membrane of the filter base, by insertion of forceps ends through an access opening in the filter base sidewall for aseptic withdrawal of the membrane from the open top of the base.
Figure 3:
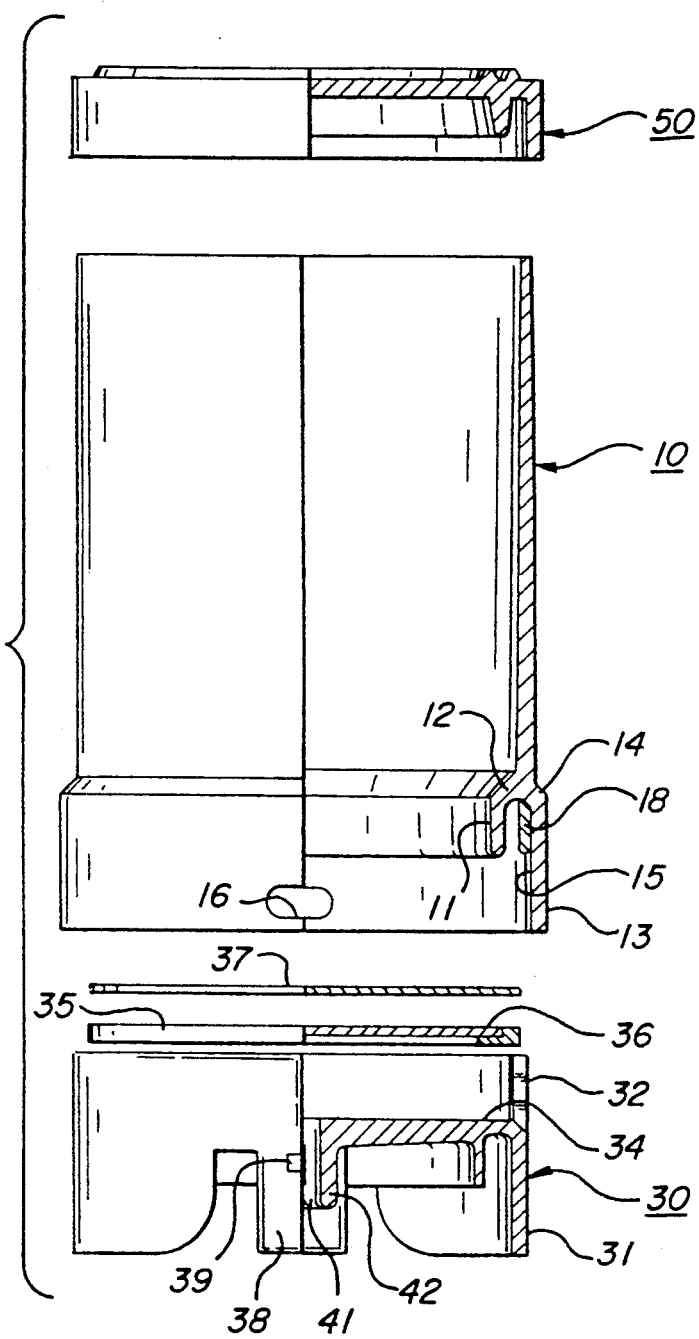
FIG. 3 is an exploded elevational view of the filter unit of FIG. 1.

The assembly in a preferred embodiment as shown in FIG. 1 comprises an upper body or reservoir 10 telescopically engaged with a lower body or base 30. The upper body by itself is open at the top as shown in FIG. 2 and the opening may be sealed by a cap or closure 50 as shown in FIG. 1. The upper body 10 as best shown in FIG. 3 has a first rim portion 11 with an internal shoulder 12 and a second rim portion 13 with an external shoulder 14 and an internal wall surface 15. The second rim portion 13 has a 180°-opposed pair of peripheral locking slots 16 located circumferentially at right angles from a 180°-opposed pair of peripheral guide ribs 18 formed on the mentioned inner wall surface 15.

Figure 4:
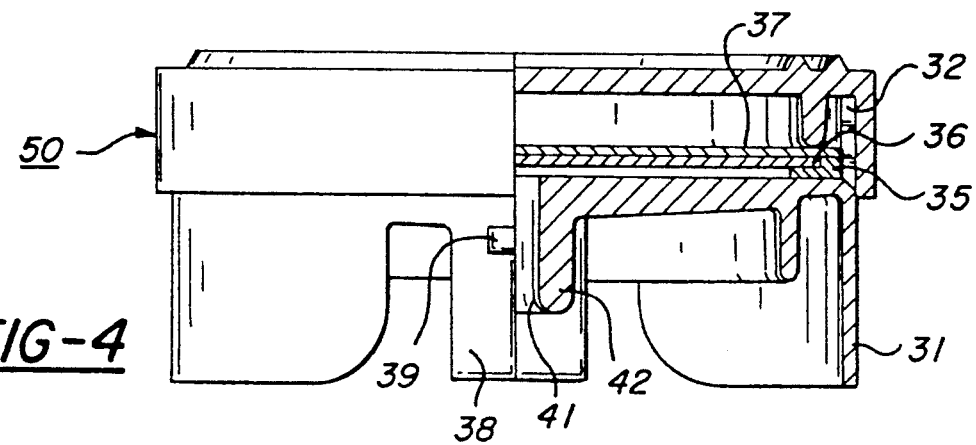
FIG. 4, is a side elevational view of assembled elements of the invention, partly in diametral cross-section.

The lower body or base 30 is formed with an outer wall 31 with an upper rim portion 32 which closely fits within and telescopically engages with the inner wall surface 15 of the upper body. For correctly guiding the joining of the upper and lower bodies, 10,30 the lower body is formed with access slot means 33 as seen in FIG. 2 which coordinate with a corresponding matching pair of the guide ribs 18 of FIG. 3. The lower body as seen in FIGS. 1 and 4 also includes a filter support 34 for an annular gasket or resilient seal ring 35 which is integral with a filter pad 36 which in turn supports a porous filter membrane 37. When the assembly is fully telescoped, the periphery of the filter membrane is compressed by the rim portion 11 in direct sealing contact coextensively with the upper surface of the annular gasket. Also, the filter membrane lies flat upon the filter pad. The lower body 30 further includes a pair of tab means 38 which can be flexed radially inwardly and which are part of and depend from the outer wall 31. The tab means are each formed at their outer wall surface with a projection 39 shaped at its outer surface for a lock fit, preferably as an inclined wedge shape, for matching and locking registry with the respective locking slots 16 of the upper body (shown in FIG. 1). The tab means are releasable from the interlock by manually squeezing the tabs together. The guide ribs 18 are circumferentially spaced from the locking slots so as to guidably assist the upper and lower bodies to be correctly placed for joining in interlocking telescopic engagement, preferably as an opposed pair of locking slots and a matching pair of tab means with body-slot matching lock fit projections. The lower comprises an opening 41 or port for effluent fluid flow, which preferably is a central opening in the filter support, preferably formed as a downspout 42, having an outlet closure 43 such as a cap or plug. The lower body by itself is open at the top to receive the filtrate or permeate, and the opening may be sealed by a closure 50 (FIG. 4), which may be a common interchangeable closure for sealing the upper body (FIG. 1).

The filter assembly of the invention is disposable after a single use, or it can be reused after replacing the used filter membrane with a fresh membrane and sterilizing the reassembled filter unit. A wide variety of microporous filter membranes can be used in the assembly, one example of which is a mixed cellulose ester membrane available as GN Metricel® from Gelman Sciences, Inc., Ann Arbor, Mich. in 0.45 μm pore size, 47 mm diameter, Type GN-6.

In use, for filtration, the filtration funnel assembly, sterilized by suitable means such as gamma radiation and is fitted to a vacuum source accessible via a valve (not shown). The closure 50 is removed, and the liquid sample or aliquot to be filtered is poured into the upper body. The vacuum is then turned on, and the entire sample liquid is drawn through the filter and out of the assembly. The vacuum is then turned off and the inside walls of the funnel are rinsed with sterile buffer solution. The closure is replaced, the vacuum is turned on, and the rinse water is completely removed through the filter, making sure that no excess liquid lies on the membrane surface. The vacuum is then turned off.

Culture Sampling a. In one use, for culture sampling, the assembly is removed from the vacuum source and is inverted. The inverted funnel is then held at a 45 degree angle, a culture medium of choice is introduced through the outlet port 41 into the base 30 while rotating it, and the port is sealed with a closure. The funnel 10 is then held with one hand, and the two tabs 38 are pinched with the thumb and index finger of the other hand to unlock the funnel 10 from the base 30. The funnel is then removed from the base and its cap 50 is removed and placed on the open end of the base (as in FIG. 4). The sealed base is then inverted and incubated for growth of colonies to be counted microscopically.

b. In another use, for culture sampling, the assembly after filtration and rinsing is removed, and the base 30 is unlocked from the funnel by manual pinching as above. The funnel is removed from the base. For removal of the filter membrane 37, the tips of a stainless steel forceps sterilized in alcohol and flame are inserted through an access slot 33 of the open base to grasp the membrane edge and lift and remove the membrane aseptically out of the open top of the base, for transfer onto a pre-poured agar plate or a petri dish/absorbent pad with broth. The container is then covered, inverted, and incubated as described above in paragraph a) for counting of colonies.

The filter assembly may be made of conventional materials. The funnel 10, base 30 and closure 50 preferably, for better viewing of the contents, are made of transparent plastic materials which preferably are polystyrene (funnel and base) and polyethylene (closure). The filter pad is preferably cellulose and the gasket is silicone.

It will be understood that while the invention has been described in its particulars with reference to a preferred embodiment thereof, various changes and modifications may be made all within the full and intended scope of the claims which follow.

What is claimed is:

1. A filtration funnel assembly comprising an open-ended upper body or reservoir for receiving liquid to be filtered and a lower body or base adapted to telescopically engage with a disengage from said upper body;

said upper body having a first rim portion defining an internal shoulder and a second rim portion defining an external shoulder having an inner wall surface;

said lower body serving as a conduit for leak-proof axial flow of filtered liquid therethrough comprising an outer wall or shell having an upper rim portion that is telescopically engaged between the internal and external shoulders of said upper body, a transverse filter support connected to said lower body a filter pad supported on said filter support with an annular gasket around said pad, and a filter membrane located on said filter pad; and the rim portion of said external shoulder having locking slot means and said outer wall having tab means with radially outward projection means that forms a lock fit with the locking slot means when the upper and lower bodies are aligned in telescopic engagement.

2. The assembly of claim 1, wherein the upper rim portion of said outer wall comprises access slot means allowing access therethrough for grasping the edge of the filter membrane for removal of the membrane from the lower body when it is disengaged from the upper body.

3. The assembly of claim 2, wherein the inner wall surface comprises guide rib means located in circumferential registry with said access slot means when the upper and lower bodies are in telescopic engagement.

4. The assembly of claim 3 wherein the guide rib means is circumferentially spaced from the locking slot means so as to guidably assist the upper and lower bodies to be correctly placed for joining in interlocking telescopic engagement.

5. The assembly of claim 1 comprising a diametrically opposed pair of slot means and a matching pair of tab means.

6. The assembly of claim 1, wherein the upper body and the lower body are generally cylindrical.

7. The assembly of claim 1 having port means comprising a central opening in the filter support.

8. The assembly of claim 7 comprising closure means for the port means.

9. The assembly of claim 7, wherein the port means is formed as a drain spout.

10. The assembly of claim 5 wherein, for locking, the tab means comprises a pair of diametrically opposed inwardly flexible tabs each formed with a projection shaped at its outer surface for locking registry with its respective slot means such that the upper and lower bodies are axially interlocked together.

11. The assembly of claim 10, wherein said projection is in a wedge shape.

12. The assembly of claim 1, wherein the periphery of the filter membrane is in direct sealing contact with and is superposed upon the annular gasket.

13. The assembly of claim 1, wherein the upper body and the lower body are each formed with an opening that one at a time may be closed by a common interchangeable closure.

14. The assembly of claim 1, wherein the filter membrane lies flat upon the filter pad.

15. The assembly of claim 12, wherein the upper and lower bodies are in telescopic engagement for air and fluid tight filtration under vacuum, said opening of the upper body is sealed by a closure and the lower rim of the internal shoulder is held under axial compression by contact with the periphery of the filter membrane which periphery is in direct compressive contact with the annular gasket.

* * * * *

UNITED STATES PATENT AND TRADEMARK OFFICE
CERTIFICATE OF CORRECTION

PATENT NO. : 5,308,483
DATED      : May 3, 1994
INVENTOR(S): Sklar et al.

It is certified that error appears in the above-indentified patent and that said Letters Patent is hereby corrected as shown below:

Column 4, line 46, delete "a" and insert --and--.

Signed and Sealed this

Sixteenth Day of August, 1994

Attest:

BRUCE LEHMAN

Attesting Officer     Commissioner of Patents and Trademarks